United States Patent [19]
Suriano et al.

[11] Patent Number: 5,654,616
[45] Date of Patent: Aug. 5, 1997

[54] WINDSHIELD WIPER SYSTEM WITH SOFT WIPE MODE FOR HIGH SPEED OPERATION

[75] Inventors: John R. Suriano; Roy McCann; Louis A. Eckert, all of Kettering, Ohio

[73] Assignee: ITT Automotive Electrical Systems, Inc., Auburn Hills, Mich.

[21] Appl. No.: 314,834

[22] Filed: Sep. 29, 1994

[51] Int. Cl.⁶ ........................................ H02P 1/04
[52] U.S. Cl. ........................ 318/443; 318/483; 318/444; 357/112
[58] Field of Search ........................ 318/443, 444, 318/483, DIG. 2; 15/250.17, 250.23, DIG. 15; 307/10.8, 10.1, 9.1, 112, 139

[56] References Cited

U.S. PATENT DOCUMENTS

| | | |
|---|---|---|
| 3,602,790 | 8/1971 | Kearns ............................. 318/443 |
| 4,158,159 | 6/1979 | Orris et al. ....................... 318/443 |
| 4,271,381 | 6/1981 | Munz et al. . |
| 4,512,056 | 4/1985 | Wattier ........................... 15/250.23 |
| 4,544,870 | 10/1985 | Kearns et al. ..................... 318/444 |
| 4,663,575 | 5/1987 | Juzswik et al. . |
| 4,843,286 | 6/1989 | Suriano et al. .................... 318/443 |
| 5,404,085 | 4/1995 | Resch et al. ...................... 318/443 |

Primary Examiner—Karen Masih
Attorney, Agent, or Firm—Thomas N. Twomey; J. Gordon Lewis

[57] ABSTRACT

A wiper system for a motor vehicle window includes a wiper arm, a permanent magnet motor, a linkage connecting the motor with the wiper arm, and a switching mechanism. The wider arm is adapted to be rotatably mounted on a vehicle body for operable movement between first and second end wipe positions. The motor is of the three brush permanent magnet type, the brushes being a high speed brush, a low speed brush and a common brush. The switching mechanism is responsive to wider blade position and is closed, electrically connecting the high speed brush with the low speed brush, thereby achieving an intermediate speed, in at least one end wipe position.

4 Claims, 3 Drawing Sheets

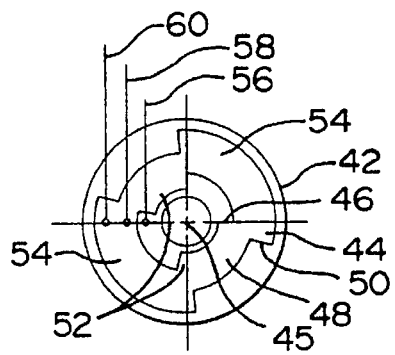 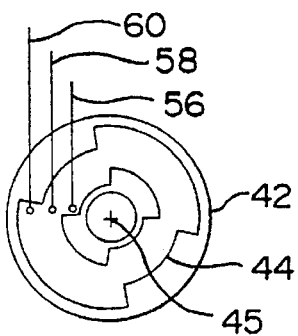 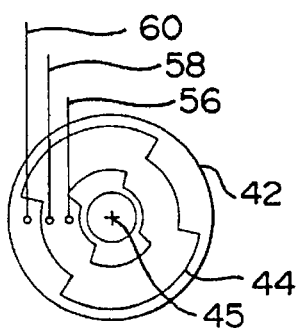
FIG 5A  FIG 5B  FIG 5C
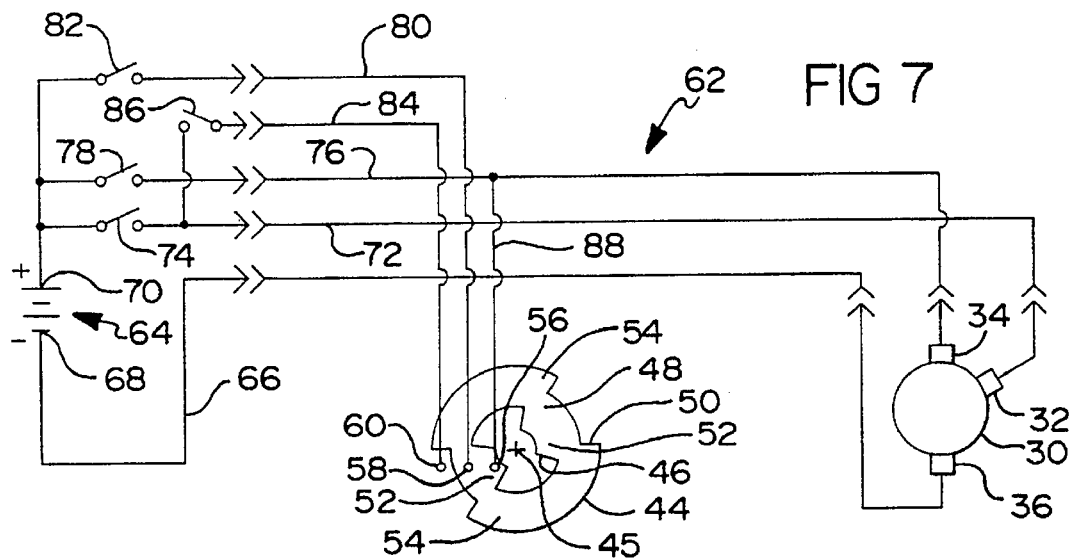
FIG 7
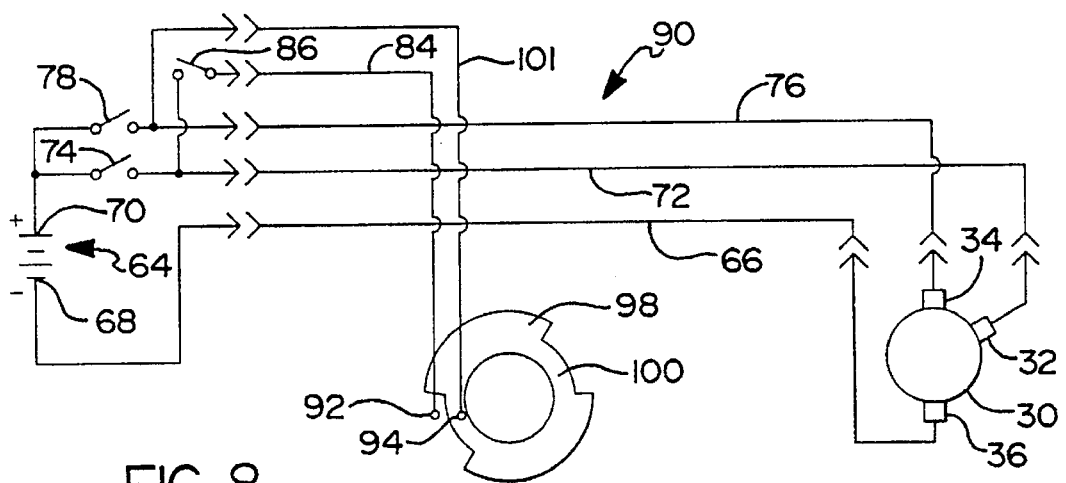
FIG 8

WINDSHIELD WIPER SYSTEM WITH SOFT WIPE MODE FOR HIGH SPEED OPERATION

TECHNICAL FIELD

This invention is directed to the field of windshield wipers, more particularly to the control of windshield wiper drive motor speeds at end wipe positions.

BACKGROUND OF THE INVENTION

Windshield wiper drive systems commonly employ an eccentric crank connecting an electric motor with a windshield wiper arm and blade for moving the arm and blade across a windshield between first and second end wipe positions. The motor tends to rotate at a constant speed in a single direction, with the eccentric crank causing the windshield wiper am and blade to reverse directions every 180° of crank rotation. These direction reversals occur at the end wide positions and result in rapid deceleration and acceleration of the arm and blade assembly. This rapid accelerating and decelerating of the windshield wiper arms and blades at the reversal points results in noise, growth of the wipe pattern as the speed of the motor increases, and excessive expulsion of water from the side of the windshield. These effects become more pronounced as the speed of the motor increases. These effects are common to all types of windshield wiper systems in which the blade's direction of travel is reversed. Common windshield wiper configurations are tandem, symmetrical overlap, single arm, and single extending arm.

It is desired to provide a windshield wiper system which minimizes or reduces the above described inertial effects at reversal points.

SUMMARY OF THE INVENTION

A wiper system for a motor vehicle window is disclosed comprising a wiper arm, a permanent magnet motor, a linkage connecting the motor with the wiper arm, and a switching mechanism. The wiper am is adapted to be rotatably mounted on a vehicle body for operable movement between first and second end wipe positions. The motor is of the three brush permanent magnet type, the brushes being a high speed brush, a low speed brush and a common brush. The switching mechanism is responsive to wiper blade position and is closed, electrically connecting the high speed brush with the low speed brush, at at least one end wipe position.

The present invention provides a wiper system having a switching mechanism which slows the motor just prior to the reversal of the blade and arm directions at the end wide positions. This is accomplished by connecting the low speed brush to a voltage source for appropriate intervals near the end wipe positions.

BRIEF DESCRIPTION OF THE DRAWINGS

FIG. 5A is a schematic representation of one embodiment of a switch in a high speed position.

FIG. 5B is a schematic representation of a switch in a medium speed position.

FIG. 5C is a schematic representation of a switch in a low speed position.

FIG. 7 is schematic representation of a first embodiment of the system.

FIG. 8 is schematic representation of a second embodiment of the system.

DETAILED DESCRIPTION OF THE PREFERRED EMBODIMENTS

Figure 1:
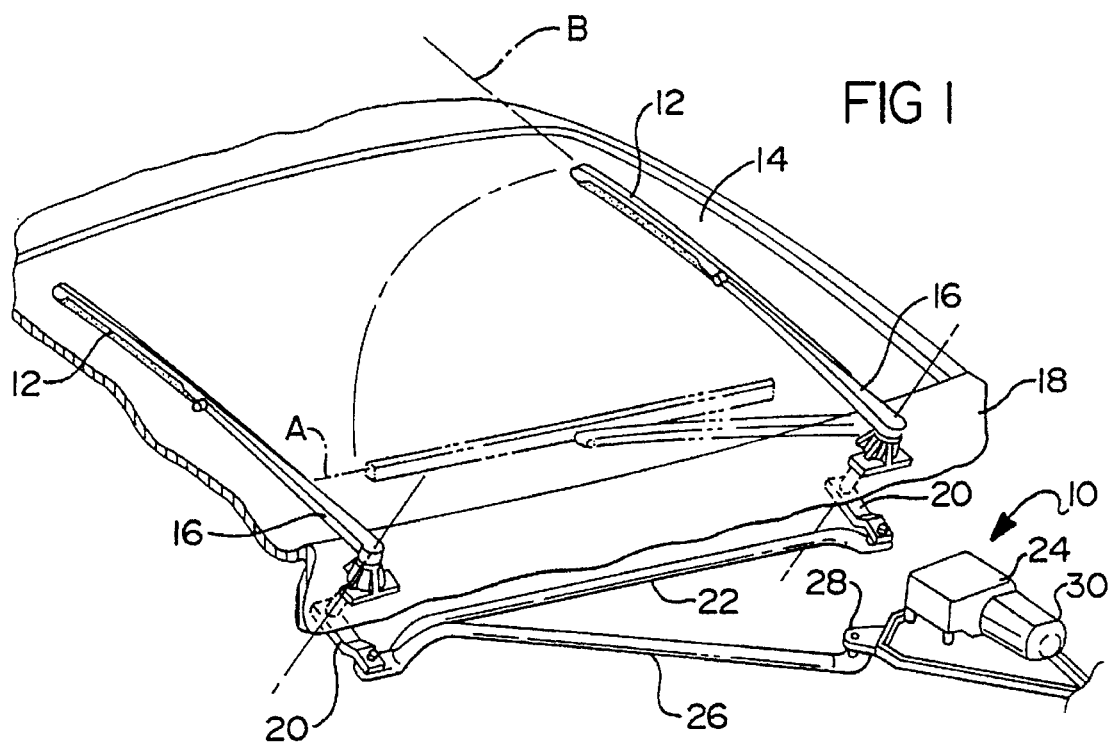
FIG. 1 shows a windshield wiper system as installed in a motor vehicle.

A typical windshield wiper system 10 is illustrated in FIG. 1. The arrangement shown is for a tandem blade system. The present invention however, is equally applicable to symmetrical overlap, single arm and single extending arm windshield wiper configurations. Wiper blades 12 are disposed against a windshield 14. The blades 12 are mounted to wiper arms 16. The wiper arms 16 are pivotably mounted to a cowling 18 of the motor vehicle body. Crank extensions 20 of the arms 16 are connected by a cross car link 22. A motor assembly 24 is mounted to the vehicle body. A drive link 26 extends from the crank extension 20 of one of the wiper arms 16 to a drive crank 28 of the motor assembly 24. The drive crank 28 acts as an eccentric driver in response to rotation of an electric drive motor 30 of the motor assembly 24. Rotation of the drive crank 28 by the motor 30 causes the end of the drive link 26 at the arm's crank extension 20 to reciprocate back and forth. As the crank 28 passes through inner wipe and outer wipe angles, the arm 16 and blade 12 move between an inner wipe position and an outer wipe position, or first end wipe position A and second end wipe position B respectively. The inner wipe and outer wipe angles of the crank are separated by approximately 180°. The second wiper arm 16 is connected to the first wiper arm by the cross car link 22, and moves in unison with the first arm. Although the electric drive motor 30 tends to rotate at a selected fixed speed, the velocity, and hence the acceleration, of the wiper arms 16 and blades 12 tends to vary sinusoidally as a function of time because of the use of the eccentric drive crank 28.

The motor 30 intended for use in this invention is a three brush permanent magnet motor. The brushes are a high speed brush 32, a low speed brush 34 and a common brush 36. As most motor vehicles today employ 12 volt D.C. electrical systems, the motor 30 is suitable for use with such systems. An application of 12 volts across the common brush 36 and the low speed brush 34 would result in the windshield wiper arm 16 cycling between the inner wipe and outer wipe positions A and B and back again at a first rate of speed. Applying 12 volts across the common brush 36 and the high speed brush 32 would result in the wiper arms 16 cycling at a second rate of speed higher than the first rate of speed. Applying 12 volts across both the high speed brush 32 and low speed brush 34 relative to the common brush 36 would result in a intermediate speed between the high speed and low speed cycles of the wiper arm 16.

Figure 3:
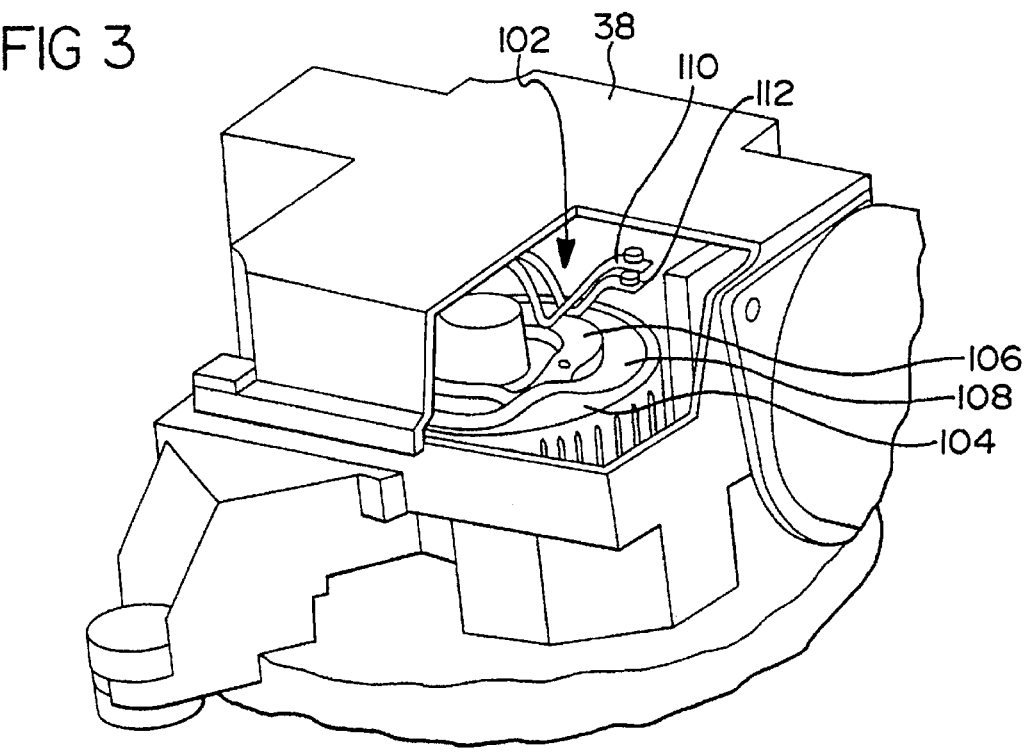
FIG. 3 is a perspective view of a motor assembly with a cam operated switch exposed.

A portion of a motor cover 38 is broken out in FIG. 3 so as to better illustrate a first embodiment of a soft wipe switching mechanism, or rotary switch 40. The switching mechanism 40 has a disc 42 with a conductive plate 44 of a predetermined shape disposed thereon and rotatable about an axis 45. FIGS. 5A, 5B and 5C better illustrate the shape of the conductive plate 44. The conductive plate 44 has an inner circumferential section 46, a middle circumferential section 48 and an outer circumferential section 50 arranged concentrically about the axis 45. The inner circumferential section 46 has two arcuate portions 52 of approximately equal arc length approximately equally spaced apart. The middle circumferential section 48 extends a full 360° around the conductive plate 44. The outer circumferential section 50 also has a pair of arcuate portions 54 of approximately equal size and approximately equally spaced apart. The arcuate portions 54 of the outer section 50 are substantially out of phase with the arcuate portions 52 of the inner section 46, but provide a slight amount of overlap therewith. The arcuate portions 54 of the outer section 50 extend over a substantially larger angle than do the arcuate portions 52 of the inner section 46.

First, second and third sliding contacts 56, 58 and 60 respectively, are mounted to a circuit board (not shown) in the motor cover 38. The inner, middle and outer circumferential sections 46, 48 and 50 respectively, are contacted by the first, second and third sliding contacts 56, 58 and 60 respectively. Tips of the contacts fall on or near a straight line across the plate 42 and passing through the axis 45.

Figure 2:
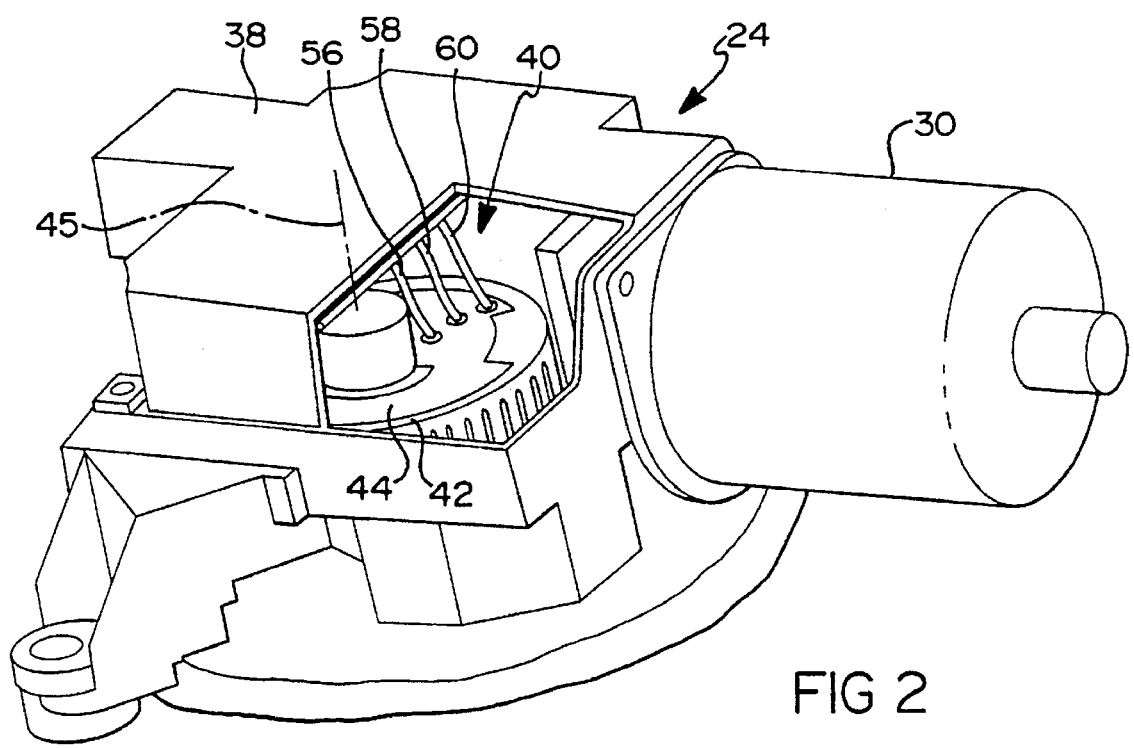
FIG. 2 is a perspective view of a motor assembly with a disc switch exposed.

FIG. 7 schematically illustrates a switching circuit 62 that would be associated with the switching mechanism 40 as illustrated in FIG. 2. The switching circuit 62 includes a 12 volt electrical power source, or battery 64, the disc 42 with the conductive plate 44, and the electric drive motor 30. A common or first conductor 66 electrically connects the common brush 36 with a negative or reference terminal 68 of the battery 64. A positive terminal 70 of the battery 64 is electrically connected to the high speed brush 32 by a second conductor 72 selectively interruptable by a first selective switch 74. A third conductor 76 extends from the positive terminal 70 to the low speed brush 34 and is selectively interrupted by a second selective switch 78. A fourth conductor 80 extends from the positive terminal 70 to the second sliding contact 58 and is selectively interrupted by a third selective switch 82. A fifth conductor 84 extends from the second conductor 72 at a point between the first selective switch 74 and the high speed brush 32, to the third sliding contact 60. The fifth conductor 84 is selectively interruptable by a fourth selective switch 86. A sixth conductor 88 extends from the third conductor 76 at a point between the second selective switch 78 and the low speed brush 34, to the first sliding contact 56.

This embodiment is able to operate in one of four modes determined by the settings of the selectively operated switches 74, 78, 82 and 86. As indicated in the chart below, the switch settings of on or closed, and off or open, can be used to elect one of a normal low speed mode, a normal high speed mode, a first soft mode, and a second soft mode.

| OPERATING | SWITCH NO. | | | |
| --- | --- | --- | --- | --- |
| MODE | 74 | 78 | 82 | 86 |
| Low Speed | OPEN | CLOSED | OPEN | OPEN |
| High Speed | CLOSED | OPEN | OPEN | OPEN |
| First Soft | OPEN | OPEN | CLOSED | CLOSED |
| Second Soft | CLOSED | OPEN | CLOSED | OPEN |

In the low and high speed modes, the motor 30 tends to rotate at a constant speed throughout the range of windshield wiper motion. In both the low and high speed modes, the motor 30 has 12 V across one of the low and high speed brushes 34, 32 for the entire range of windshield wiper motion.

In the first soft mode, switches 82 and 86 are closed. As a result, the motor 30 rotates at high speed when only the second and third sliding contacts 58 and 60 contact the conductive plate 44. When only the first and second sliding contacts 56 and 58 contact the conductive plate 44, the motor 30 operates at low speed. When all three of the sliding contacts 56, 58 and 60 contact the conductive plate 44, then the motor 30 rotates at an intermediate speed between the high and low speeds. Thus, as the disc 42 rotates, the speed of the motor 30 alternates from high speed to intermediate speed to low speed back to intermediate speed and then to high speed. This cycle continually repeats itself with continued rotation of the disc 42.

Figure 4A:
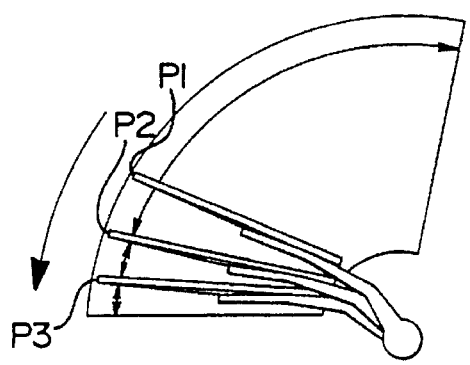
FIG. 4A is a schematic representation of a wiper blade approaching an innerwipe position.
Figure 4B:
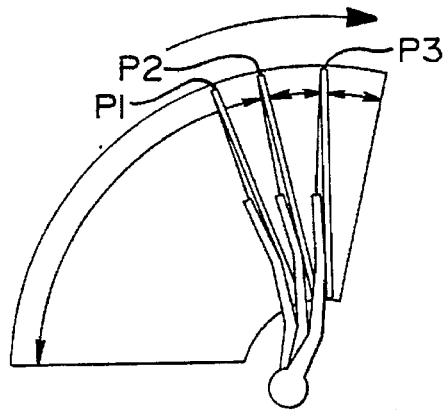
FIG. 4B is a schematic representation of a wiper blade approaching an outer wipe position.

FIGS. 4A and 4B, together with FIGS. 5A, 5B and 5C facilitate understanding a synchronization of the wiper position with these variations in motor speed. Most of the wiper blade's travel across the windshield 14 is with the motor 30 operating at high speed in the region indicating by P1. As the wiper blade approaches either of the end wipe positions A and B, it reaches a region indicated by P2 where the motor 30 begins to operate at the intermediate speed. Further rotation of the wiper arm 16 toward the end wipe position causes the arm to enter region P3 where the motor 30 operates at low speed. As the eccentric driver 28 passes over center at the end wipe position and the blade 12 reverses direction, the above described sequence is reversed. This synchronization of motor speed with blade position is achieved when the drive crank 28 is at an end wipe angle, and the center of the inner arcuate portion 52 is aligned with the first sliding contact 56.

In the second soft mode, the switches 74 and 82 are closed. As in the first soft mode, the motor 30 rotates at high speed when only the second and third sliding contacts 58 and 60 contact the conductive plate 44. Also, when all three of the sliding contacts 56, 58 and 60 contact the conductive plate 44, the motor rotates at the intermediate speed. The distinction between the first and second soft modes is apparent when only the first and second sliding contacts, 56 and 58 respectively, contact the conductive plate 44. The motor 30 rotates at the intermediate speed instead of the low speed. Intermediate speed rotation results because in the second soft mode, there are 12 volts across both the high and low speed brushes 32 and 34.

Figure 6A:
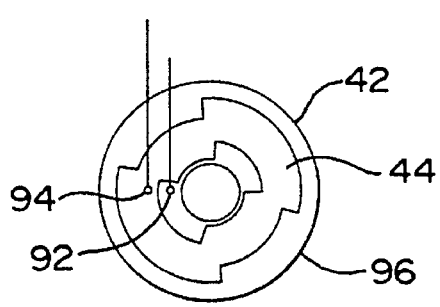
FIG. 6A is a schematic representation of a second embodiment of the switch in a high speed position.
Figure 6B:
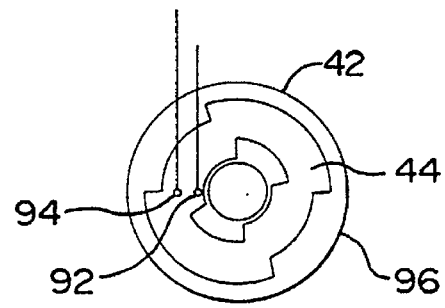
FIG. 6B is a schematic representation of the second embodiment of the switch in a medium switch position.

The embodiments of FIGS. 6A and 6B, and FIG. 8 operate in essentially the same way as does the embodiment of FIGS. 2 and 5A, 5B and 5C, but employ only two sliding contacts instead of three and are capable of providing a soft mode equivalent to the second soft mode. FIG. 8 shows an alternative switching circuit 90 providing a soft mode equivalent to the second soft mode of the switching circuit 62, and employing just two sliding contacts 92 and 94. The circuit 90 shows a conductive plate 96 with just two concentric circumferential sections 98 and 100. A jumper wire 101 connects the third conductor 76 with the inner sliding contact 94. Conductors 80 and 88 of circuit 62 are eliminated. The system operates in the second soft mode when switch 74 is closed, 78 is open, and 86 is closed. FIGS. 6A and 6B show the conductive plate 44 of circuit 62 with the three concentric circumferential sections 46, 48 and 50 employing only two sliding contacts. Such a combination could be used in the circuit of FIG. 8 instead of the two circumferential section conductive plate 96.

FIG. 3 shows a motor with its cover partially cut away to reveal a soft wipe switching mechanism 102 of alternative construction. A disc 104 has two concentric cam surfaces 106 and 108 instead of a conductive plate. A pair of reed switches 110 and 112 are aligned with the cam surfaces 106 and 108, and have tips aligned with each other. Vertical displacement of the reed switches 110 and 112 by the cam surfaces 106 and 108 makes and breaks contact between them. Just as with the conductive plates and sliding contacts of the previously described embodiments, electrical communication between the switches 110 and 112 is a function of the angular position of the disc 104 and is used to slow the wiper motor at the end wipe positions.

It is appreciated that while the disclosed discs rotate as a unit with the drive crank 28, alternative motor assembly configurations could rotate the disc at a speed which differs from that of the drive crank 28 and the motor 30 by a fixed ratio. For example, a disc rotating at twice the speed of the drive crank 28 and a ratio of 2, would have a conductive plate with just a single angular notch or non-conducting portion which would provide the desired twice per revolution crank speed variations. Or, alternatively, a disc rotating at one third the speed of the drive crank 28 would, and a ratio of ⅓ have a conductive plate with six equally spaced notches.

Common to all of the embodiments is that all speed changes are made with at least one of the high speed and low speed brushes being continually energized. For example, in going from high speed operation to intermediate speed operation, the high speed brush remains continually energized while simultaneously energizing the low speed brush to achieve the intermediate speed. This prevents the occurrence of any dead spots during the speed transition where the motor is momentarily energized through neither of the brushes as might occur if a switch goes directly from energizing just the low speed brush with no overlap.

The type of switch mechanism shown in this disclosure, employing a conductive plate or a cam surface, are known in the field of park switches for windshield wiper drive units. Other switch mechanisms, such as low current switching of relays through microswitches, are also well suited to the necessary synchronization of the application of voltage to the motor brushes with the crank 28 position.

The foregoing description is made for purpose of illustration only and is not intended to limit the scope of the invention which is only to be determined from the appended claims.

We claim:

1. A wiper system for a motor vehicle window comprising:

a wiper arm adapted to be rotatably mounted on a vehicle body and operably moving between a first end wipe position and a second end wipe position;

a three brush permanent magnet motor having a high speed brush, a low speed brush and a common brush;

a linkage connecting the motor with the wiper arm having a drive crank drivingly connected with the motor;

a rotatory switch drivingly connected with the motor for rotation in synchronization with the drive crank and electrically connected in a soft mode of operation with the high speed and the low speed motor brushes and having a first circumferential section electrically connecting the high speed brush to a voltage source for at least one-third of the wiper arm motion between the first end wipe position and the second end wipe position and a second circumferential section angularly overlapping at least part of the first circumferential section and electrically connecting the low speed brush to a voltage source for wiper arm motion at least at one of the end wipe positions.

2. A wiper system for a motor vehicle window comprising:

a wiper arm adapted to be rotatably mounted on a vehicle body and operably moving between a first end wipe position and a second end wipe position;

a three brush permanent magnet motor having a high speed brush, a low speed brush and a common brush;

a linkage connecting the motor with the wiper arm;

a rotatory switch having first and second electrical switching contacts rotatably fixed relative to the vehicle body and connected to the low speed brush and to the high speed brush of the motor respectively in a soft mode of operation, and a rotating element operably rotating about an axis drivingly connected with the motor for rotation therewith at a fixed ratio of speed to the motor and operably engaged by the first electrical switching contact on a first circumference about the axis and by the second electrical switching contact on a second circumference about the axis and having a first arcuate portion of one of the first circumference and the second circumference operably engaging the first electrical switching contact and the second electrical switching contact to electrically connect the first and second electrical switching contacts as the wiper arm approaches one of the end wipe positions, thereby reducing a rotative speed of the motor.

3. A wiper system for a motor vehicle window comprising:

a wiper arm adapted to be rotatably mounted on a vehicle body and operably moving between a first end wipe position and a second end wipe position;

an electrical power source;

a three brush permanent magnet motor having a high speed brush, a low speed brush and a common brush;

an eccentric drive linkage connecting the motor with the wiper arm having a drive crank drivingly connected with the motor; and a plurality of microswitches mechanically connected with the drive crank for opening and closing responsive to drive crank rotation and resultantly electrically connecting the electrical power source with the low speed motor brush when the wiper arm is at least at one of the first end wipe position and the second end wipe position and electrically connecting the high speed brush to the electrical power source for at least one-third of the wiper arm motion between the first end wipe position and the second end wipe position and the microswitches electrically connecting both the low speed brush and the high speed brush to the electrical power source as the wiper arm approaches the one of the first end wipe position and the second end wipe position.

4. A wiper system as claimed in claim 3 further comprising:

a first relay electrically connected to at least one of the microswitches and disposed between the electrical power source and the motor brush; and a second relay electrically connected to at least one of the microswitches and disposed between the electrical power source and the low speed brush, wherein when at least one of the microswitches communicates a low current signal to one of the relays with the one of the relays resultantly connecting the corresponding brush to the electrical power source.

* * * * *